UNITED STATES PATENT OFFICE.

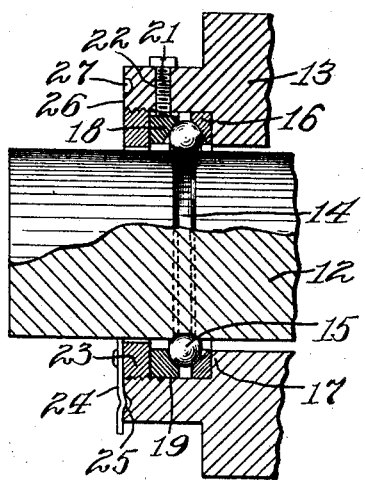
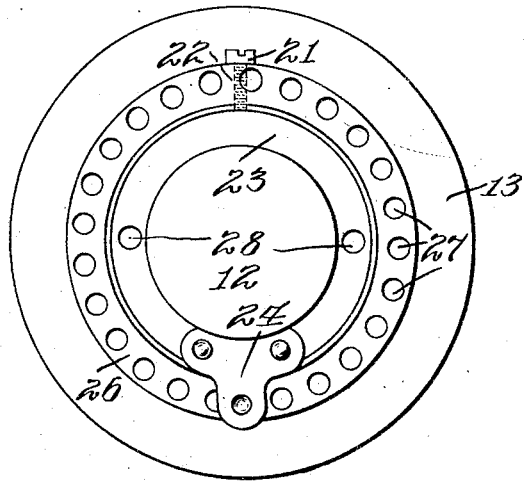
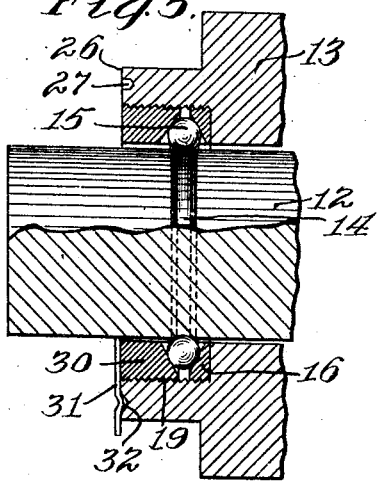
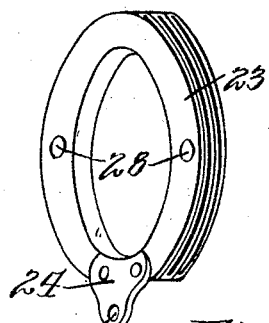
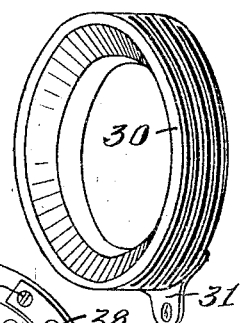
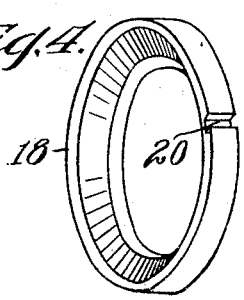

BENJAMIN F. LEAVITT, OF NORWICH, CONNECTICUT.

AUTOMATIC LOCK FOR BEARINGS.

No. 829,658.　　　Specification of Letters Patent.　　　Patented Aug. 28, 1906.

Application filed December 1, 1905. Serial No. 289,750.

*To all whom it may concern:*

Be it known that I, BENJAMIN F. LEAVITT, a citizen of the United States, residing in Norwich, in the county of New London and State of Connecticut, have invented certain new and useful Improvements in Automatic Locks for Bearings, of which the following is a specification.

This invention has reference to automatic locks especially adapted for the adjustable parts of a bearing, such as an antifriction or ball bearing.

The object of the invention is to produce a construction wherein the adjustable member of a bearing element when given the proper adjustment will be automatically locked in such position and which member may be moved in either direction for adjustment within a certain range, yet will be automatically locked in such adjusted positions.

In the accompanying drawings is shown two embodiments of my invention organized for use in a ball-bearing, in which—

Figure 1 is an axial section, partly in elevation. Fig. 2 is an end view of the structure shown in Fig. 1. Fig. 3 shows the adjusting member shown in Figs. 1 and 2. Fig. 4 shows the bearing member of the structure of Figs. 1 and 2. Fig. 5 is an axial section through a modification of the device shown in Figs. 1 and 2. Fig. 6 shows the adjustable bearing member of Fig. 5, and Fig. 7 shows a modified form of the automatic locking means.

The journal 12 is mounted for rotation in a supporting member 13. The journal is provided with an annular groove 14 for engagement with a series of antifriction members, such as balls 15, the groove being curved corresponding with the curvature of the balls. In Fig. 1 the supporting member 13 is shown as provided with a collar 16, that is engaged by a shoulder 17 of the support, and which collar may be secured in such position by being tightly fitted in the supporting member or by other means. The bearing is provided with an adjustable bearing element that is furnished with automatic locking means cooperating with the supporting member 13 to retain the bearing element in adjusted positions. In the structure shown in Fig. 1 the bearing element comprises two members. One of the members consists of a ring or collar 18, that is movable axially in the bore 19 of the supporting member to and from the fixed bearing-collar 16, whereby to move the balls inward into proper engagement with the groove in the journal. This collar 18 is shown as provided with a transverse slot 20 in its periphery, into which slot projects a suitable detent, such as a screw 21, tapped into a threaded aperture 22 in the supporting member 13. This screw and slot will prevent rotation of the collar 18 in the supporting member, but will permit axial movement thereof. The other member of the bearing element consists of a collar 23, that is externally screw-threaded to engage the internally-threaded bore 19 of the supporting member 13. Upon rotation of the threaded collar 23 by any suitable means it will engage the bearing-collar 18 and advance the latter into proper engagement with the balls 15. For the purpose of automatically locking this adjusting-collar 23 to the supporting member 13 a spring is secured on the outer or side face of one of these two members, and the other member is provided with a circular series of projecting portions. The spring and projecting portions are so organized that upon the two collars of this bearing element being properly adjusted the spring will engage the projecting portions and automatically lock the adjusting-collar 23 against movement; but the flexibility of the spring will permit the rotation of the adjusting-collar within a certain range in either direction from said position, yet still engage the said member to lock the collar. One form of such automatic lock is shown as comprising a spring 24, secured to the locking-ring 23 by suitable means, such as rivets, which spring is provided with a projection 25, extending inwardly a short distance.

The end or diametral face 26 of the supporting member 13 is provided with a circular series of engaging portions shown as consisting of recesses 27. The end faces of the supporting member and adjusting-ring are formed to be in a substantially registering or flush position upon the proper adjustment of the two members of this bearing element, or the outer face of the adjusting beyond the end face of the supporting member.

By this arrangement the spring 24, projecting radially outward, will be in position to have its projection 25 engage the recesses 27 to lock the ring in its adjusted positions within a certain range of movement. Any suitable means may be provided for properly engaging the adjusting-ring 23 for turning the same, it being shown as having two diametrically opposite apertures 28, that may be engaged by a suitable spanner device in the well-known manner.

In Fig. 5 is shown a similar organization for automatic adjustment, but in which the adjustable bearing element is formed of a single member instead of two members, as has been herein set forth. In this instance the journal 12 is mounted in the supporting member 13 and supported therefrom by the balls 15, that engage the fixed bearing-ring 16, as set forth in the description of Fig. 1. The supporting member 13 is provided with the threaded bore 19, and into this bore is screwed a bearing member or collar 30, that engages the balls 15 by its inner face. This adjusting-collar 30 is so formed that when adjusted to engage the balls 15 its outer end face will be about flush with the end face of the supporting member 13 or else project a slight distance therebetween. The adjusting-collar 30 is provided with a spring 31, similar to the spring 24, secured to the adjusting-collar 23. This spring 31, that is secured to the bearing element 30 in any suitable manner, such as by rivets, is provided with a projection 32 on its inner face. The spring projection 32 is arranged to engage with the apertures 27 on the diametral face of the supporting member 13, and thereby serves to automatically lock the adjustable bearing element 30 in the same manner as described with reference to Fig. 1.

In Fig. 7 is shown a modification of the automatic locking means applicable to the construction of Fig. 5. In this arrangement the locking-spring is mounted on the supporting member 13, while the circular series of engaging portions are formed on the inner adjustable bearing element, which may either be the locking-ring 19 or the adjustable bearing element 30. A spring 33 is pivoted at 34 on the supporting member and has its other extremity extending transversely and provided with a projecting portion 35, which portion overhangs the adjustable bearing member 36 for engagement with the recesses 37 therein. To permit insertion and removal of the ring 36, the spring 33 is swung outward on its pivot 34, which will bring the end portion carrying the projection 35 out of the path of movement of the ring 36. The spring 33 is shown as normally retained in locking position by means of a projection 38, that may engage a suitable recess in the supporting member 13.

Having thus described my invention, I claim—

1. The combination of an externally-threaded member, a member having a threaded bore engaged by said member, and a spring secured to one of said threaded members, the other of said threaded members being provided with a circular series of engaging portions arranged to be engaged successively by a part of the spring upon rotation of the threaded members, whereby the members are automatically locked in adjusted positions.

2. The combination of an externally-threaded member, a member having a threaded bore engaged by said member, and a spring secured to one of said threaded members and provided with a projection, the other of said threaded members being provied with a circular series of recesses successively engaged by the spring projection upon relative movement of the threaded members, whereby the members are automatically locked in adjusted positions.

3. The combination of a member having an internal thread, a member externally threaded to screw into said member, one of said members being provided with a spring, the other member being provided with a circular series of engaging portions disposed in a diametral plane and successively engaged by the spring upon relative rotation of the members, whereby the members are automatically locked in adjusted positions.

4. The combination of a member having an internal thread, a member having an external thread and arranged to screw into said member, and a spring secured to the externally-threaded member and having a projection, said internally-threaded member being provided with a circular series of recesses on a diametral face arranged to be engaged successively by the spring projection upon relative rotation of the threaded members to automatically lock the members in adjusted positions.

5. In a bearing, the combination of a supporting member provided with a threaded bore, a bearing element adjustable axially in such bore, the bearing element having a part provided with an external thread engaging the threaded bore to adjust the bearing element in the support, the supporting member and bearing element being provided with automatic locking means comprising a spring secured to one of said members, the other of said members being provided with a circular series of engaging portions successively engaged by the spring upon rotation of the bearing element.

6. In a bearing, the combination of a supporting member provided with a threaded bore, a bearing element adjustable in said bore, a bearing element having a part provided with an external thread engaging the threaded bore, a spring secured to the outer face of the bearing element and provided with a projection, the end face of the supporting member being provided with a circular series of recesses arranged to be engaged successively by the spring projection to lock the bearing element in adjusted positions.

7. In a bearing, the combination of a supporting member provided with a threaded bore, a bearing element located in said bore and comprising two collar members, one of the collar members being provided with a bearing-surface and having a transverse slot in its periphery, a projection on the supporting member extending into said slot to permit axial movement of the bearing-collar but prevent its rotation in the bore, the other collar of the bearing element being provided with external threads engaging the threaded bore of the supporting member, a spring fast on the end face of the threaded collar, the end face of the supporting member being provided with a circular series of recesses arranged to be successively engaged by said spring to automatically lock the threaded collar in adjusted positions.

Signed at Nos. 9 to 15 Murray street, New York, N. Y., this 29th day of November, 1905.

BENJAMIN F. LEAVITT.

Witnesses:
F. E. BOYCE,
WILLIAM H. REID.